Nov. 13, 1934.  H. W. RUPPLE  1,980,440
FEED FOR AUTOMATIC MACHINE TOOLS
Filed Feb. 9, 1932  4 Sheets-Sheet 1

INVENTOR:
HARRY W. RUPPLE
ATTORNEYS

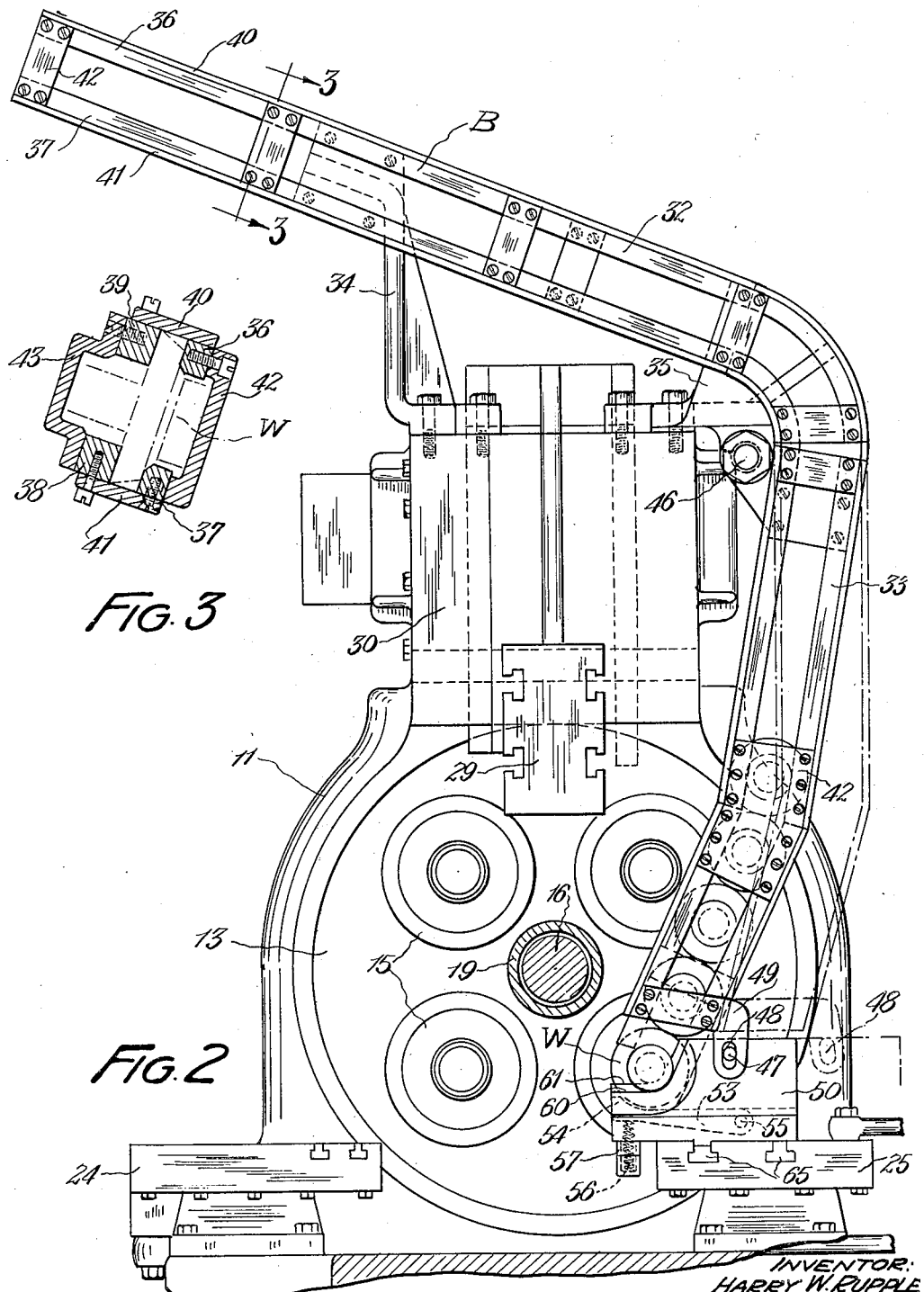

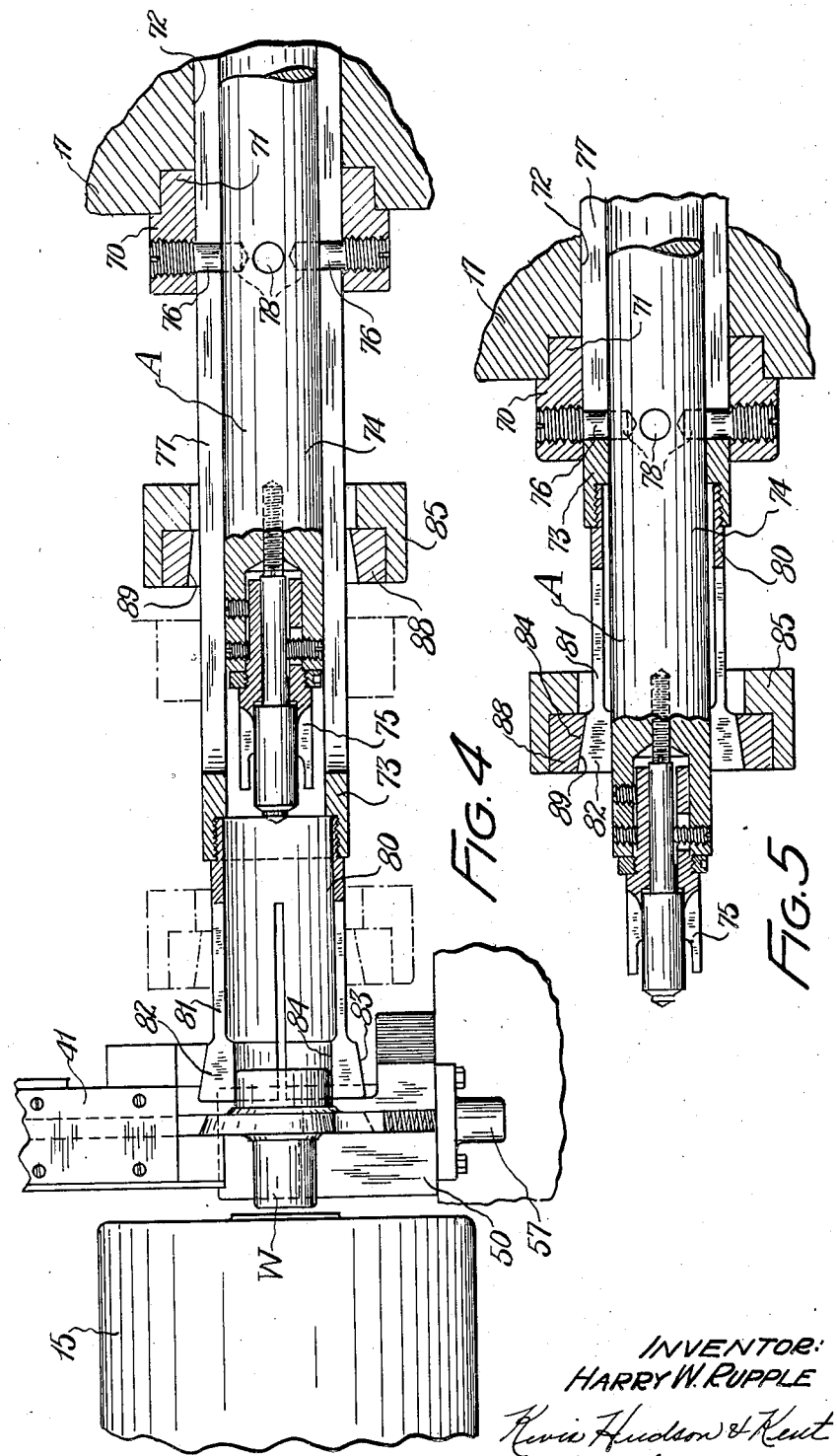

Nov. 13, 1934.  H. W. RUPPLE  1,980,440
FEED FOR AUTOMATIC MACHINE TOOLS
Filed Feb. 9, 1932  4 Sheets-Sheet 4

INVENTOR:
HARRY W. RUPPLE.
ATTORNEYS

Patented Nov. 13, 1934

1,980,440

UNITED STATES PATENT OFFICE 1,980,440

FEED FOR AUTOMATIC MACHINE TOOLS

Harry W. Rupple, Shaker Heights, Ohio, assignor to The Cleveland Automatic Machine Company, Cleveland, Ohio, a corporation of Ohio Application February 9, 1932, Serial No. 591,836

19 Claims. (Cl. 29—38)

The present invention relates to automatic metal working machine tools and more particularly to mechanism for feeding work blanks to a multiple spindle indexible type of chucking machine.

In machines of the general character referred to, the work, which consists of a blank, is held in a chuck carried by a rotatable spindle supported in an indexible spindle turret. A plurality of spindles are equally spaced about the axis of the spindle turret and the work is indexed by intermittent rotation of the spindle turret from station to station where the machining operations are performed. The tools are supported at the various stations upon a tool slide supported by the machine bed in such a manner that it may be moved towards or from the spindle turret in a direction parallel with the axis thereof. The tool slide is provided with a plurality of tool spindles, usually one for each station, and, in some instances, the movement of the tool spindles towards and from the work is accelerated with reference to the movement of the tool slide in which event they are commonly called accelerated spindles.

The machines are usually provided with cross-slides and/or head slides and the tool slide is provided with an auxiliary tool slide formed integral therewith or fixed thereto which extends towards the spindle turret surrounding the spindle drive shaft. The auxiliary tool slide has finished surfaces formed thereon to which tool holders etc. are attached. The work blanks are chucked in the spindle chucks and the finished pieces removed by manual or mechanical means at one of the stations of the machine, commonly called the loading station. A machine of the general type referred to is illustrated in my copending application Serial No. 549,586, filed July 9, 1931.

An object of the present invention is the provision of novel means for feeding work blanks to a machine of the character referred to.

Another object of the invention is the provision of a novel mechanism for feeding blanks to an automatic metal working chucking machine, part of which mechanism will be supported on, and operated by, a cross-slide of the machine.

Another object of the invention is the provision of a novel metal working machine tool of the chucking type provided with a blank magazine and feeding means which will automatically feed the blanks to the chucks at predetermined intervals.

Another object of the invention is the provision of a novel automatic metal working machine tool of the chucking type which includes a blank magazine and feeding means, and which will automatically perform the chucking and finishing operations without attention from an operator except that of supplying blanks to the magazine.

Another object of the invention is the provision of a novel means of supporting a tool in a tool spindle of an automatic metal working machine.

Further objects of the invention will be apparent to those skilled in the art from the following description of the preferred embodiment of the invention described with reference to the accompanying drawings, in which Fig. 1 is a perspective view of the central part of an automatic metal working machine embodying the present invention;

Fig. 2 is a sectional view looking towards the spindle turret;

Fig. 3 is a sectional view taken on the line 3—3 of Fig. 2;

Fig. 4 is a vertical view taken through the axis of the lower rear spindle of the machine shown in Figs. 1 and 2 with portions in elevation;

Fig. 5 is a view similar to Fig. 4 but with the parts of the machine in a different operating position;

Similar reference characters designate corresponding parts throughout the several figures of the drawings.

Figure 1:
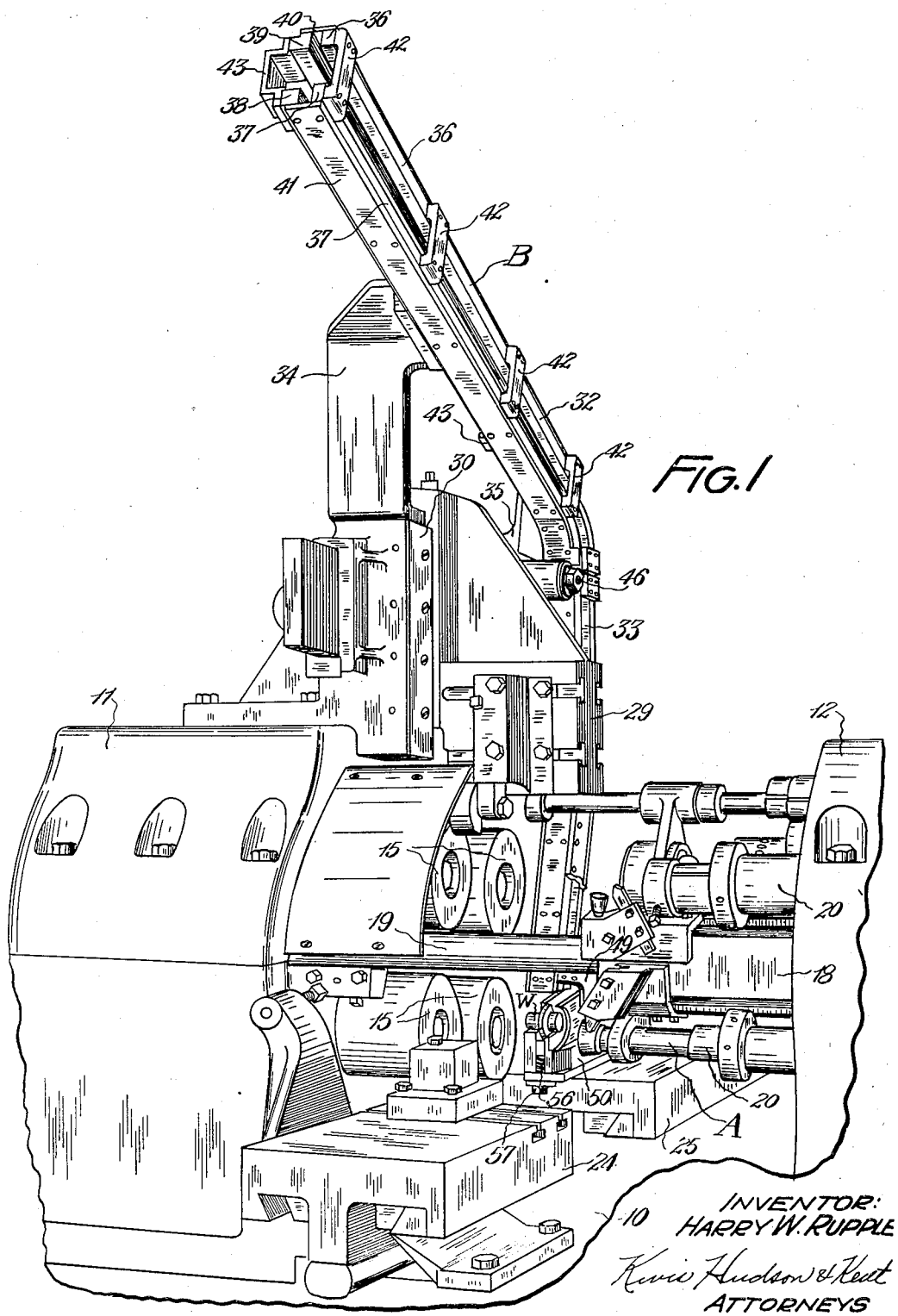
Figure 6:
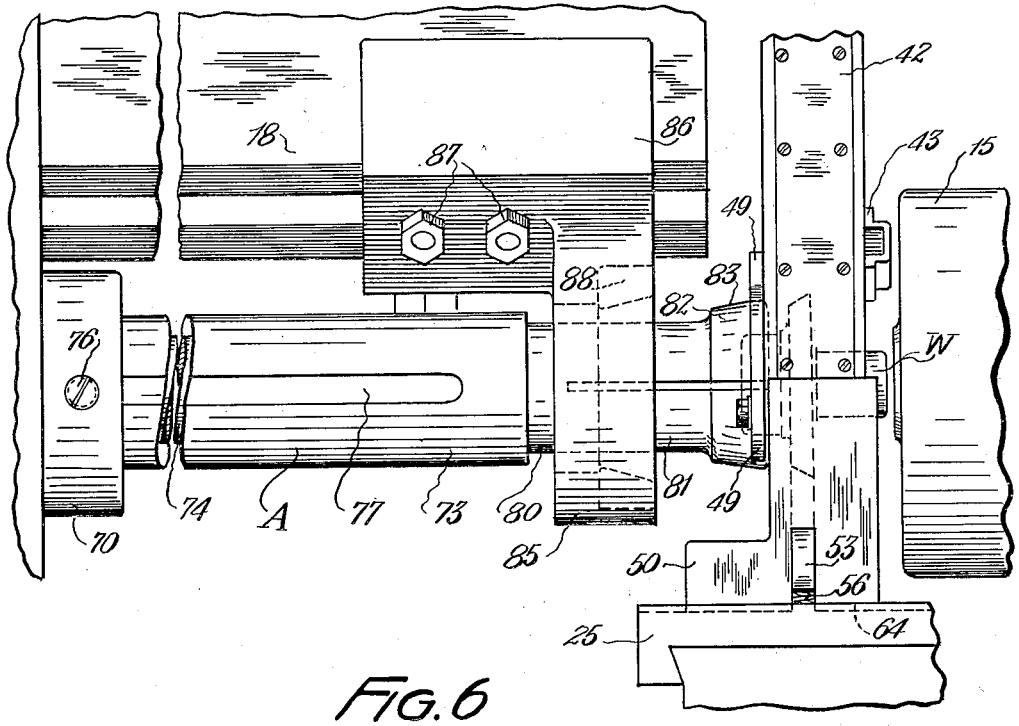
Fig. 6 is a rear view of the spindle shown in Fig. 4.
Figures 7, 8:
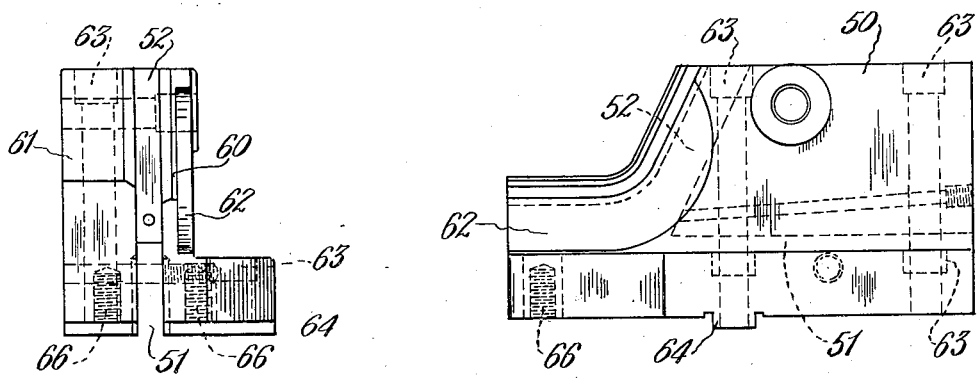
Fig. 7 is a detail view of part of the magazine.
Fig. 8 is a left end view of the magazine element shown in Fig. 6.

Referring to the drawings, Fig. 1 shows the central part of an automatic metal working machine of a well known type provided with or modified to embody the preferred construction of the present invention. The bed of the machine is designated in general by the reference character 10 and supports a spindle turret head 11 and a tool slide head 12 near opposite ends thereof.

A spindle turret 13 is rotatably supported in the spindle turret head and carries a plurality of spindles, in the present instance four, rotatably mounted therein. Each of the spindles is provided with a chuck 15 the jaws of which are manually or automatically operated in timed relation to the other operation of the machine. The spindle drive shaft is indicated by the reference character 16, see Fig. 2. The spindle turret end of the machine is well known in the art and may be found in a plurality of different embodiments, preferred constructions of which are illustrated in my copending applications Serial No. 575,734, filed November 18, 1931, and Serial No. 584,421, filed January 2, 1932, and the application previously referred to.

A tool slide 17 provided with an auxiliary slide 18 surrounding the tubular member 19 extending between the tool slide and the spindle turret 13 is slidably supported in the tool slide head 12 and adapted to be reciprocated towards and from the spindle turret 13 in a manner well known in the art. The lower rear spindle A of a plurality of tool spindles supported in the tool slide 17 includes an accelerated spindle which is adapted to be reciprocated towards and from the spindle turret in advance of and/or independent of the reciprocation of the tool slide. The two front tool spindles of the machine are designated by the reference character 20. In the machine illustrated the lower rear station is the loading station. The construction of the tool slide end of the machine, with the exception of the specific construction of the lower rear spindle illustrated and which will be herein after referred to, including the operating mechanism for the various spindles, is well known in the art and may be found in a plurality of different embodiments, preferred constructions of which are shown in my copending applications Serial No. 557,572, filed August 17, 1931, and my first mentioned copending application, to which reference is made for a more detailed disclosure.

Cross-slides 24 and 25 are slidably supported on the front and rear of the machine, respectively, and are reciprocated towards and from the spindles in any suitable manner in timed relation to the other operations of the machine. A preferred construction of the cross-slides and the operating mechanism therefor is shown in my copending application Serial No. 572,005, filed October 30, 1931.

A head slide 29 slidably supported in a head slide bracket 30, bolted or otherwise secured to the spindle turret head, is vertically reciprocated in timed relation to the other operations of the machine.

A blank magazine designated in general by the reference character B, consisting of an upper part 32 and a lower part 33, is attached to the head slide bracket 30 by brackets 34 and 35 bolted or otherwise secured thereto. The cross-section of the magazine is the same throughout and may be varied to accommodate work blanks of different shape. As illustrated the magazine B is constructed to accommodate work blanks W and consists of generally rectangular bars 36, 37, 38 and 39 fastened together with top and bottom plates 40 and 41 and side straps 42 and 43, see Figs. 2 and 3. The upper part 32 of the magazine B is inclined so that the blanks will roll or slide towards the rear of the machine and into the lower part 33 of the magazines from which they are fed to the machine proper.

The lower part 33 of the magazine B is pivotally supported on a bolt or pin 46 carried in a suitable boss formed on the bracket 35, and the bottom end thereof is pivotally connected, by means of a pin 47 engaging in an elongated slot 48 formed in an arm 49 attached to the lower end thereof, to a transfer member 50 bolted or otherwise secured to the top of the rear cross-slide 25. The construction is such that the part 33 of the magazine B will be oscillated between the dotted and full line positions shown in Fig. 2, upon reciprocation of the slide 25. When the parts are in the position illustrated in Fig. 2, the lower work blank W is in axial alignment with the work spindle in the lower rear or loading station.

The transfer member 50 is of general rectangular shape and is provided with two intersecting grooves 51 and 52 formed therein, normal to the axis of the spindle turret. The groove 52 is adapted to accommodate the large diameter flange on the work blank W as the same is fed thereto from the magazine B. A lever 53, provided with an upwardly extending projection 54, is pivotally supported in the groove 51 as by a pin 55. The lever 53 is resiliently forced in an upward direction, as viewed in Fig. 2, by a spring 56 supported in a member 57 bolted or otherwise secured to the lower side of the transfer member 50. As the work blanks W are fed from the magazine B to the transfer member 50 they rest upon surfaces 60 and 61 formed on the upper side of one end thereof. The transfer member 50 is cut away as at 62 to accommodate the end of a resilient feeding collet hereinafter referred to. Bolt holes 63 accommodate bolts used in securing the member 50 to the cross-slide 25 and the tongue 64 formed on the bottom thereof projects into one of the T-slots 65 in the cross-slide to secure the same in position thereon. The tapped holes 66 are used in bolting the member 57 to the transfer member 50.

The tool spindle A in the lower rear or loading station comprises the following mechanism. A collar member 70 provided with a reduced end 71 adapted to fit into an aperture formed in the tool slide 17 is bolted or otherwise secured to said slide coaxial with the longitudinal aperture 72. A tubular member 73 slidably supported in the aperture 72 is reciprocated relative to the tool slide 17 independent thereof and constitutes an accelerated spindle or the accelerated element of the tool spindle A. A tool holder 74 carrying a tool 75 is positioned inside of the tubular member 73 and attached to the tool slide 17 by means of a plurality of pilot screws 76 carried by the collar member 70, and extending through elongated slots 77 in the tubular member 73 into apertures 78 is the tool holder 74. The tubular member 73 carries at the projecting end thereof a chuck collet 80 provided with a plurality of resilient fingers 81. The free end 82 of the fingers 81 are enlarged and have a tapered exterior surface 83, and an interior surface 84 of a diameter slightly less than the projection on the work blank W which it is adapted to engage and substantially the same as that of the tool holder 74.

An annular support 85 formed integral with a base member 86 is bolted to the auxiliary tool slide 18 of the tool slide 17 by means of bolts 87. The annular member 85 has a bushing 88 secured thereto and surrounds the spindle A. The interior of the bushing 88 is tapered as at 89, the taper of which is complementary to that of the taper 83 formed on the resilient finger 81 of the chuck collet 80. From the foregoing description it will be apparent that the tool slide 17, the tool holder 74 and the annular member 85 will move as a unit, and that the tubular member 73 together with the chuck collet 80 will move independent thereof.

The operation of the device is as follows: Assuming that the machine is at rest with the lower part of the magazine B in its rear position, a plurality of work blanks W are inserted in the top open end of the magazine, and permitted to move to the other end thereof until the magazine is filled. The lower work blank W in the magazine will rest upon the surfaces 60, 61 of the transfer member 50 and will be prevented from falling out of the open end of said member by the spring pressed lever 53. The tool slide 17 and the accelerated spindle 73 are in their retracted position. The machine is then started and the rear slide 25 together with the lower part 33 of the magazine B is moved to their forward positions, shown in full lines in Fig. 2, with the bottom work blank W in axial alignment with the lower rear spindle, that is, the spindle in the loading position.

While the work blank W is held in axial alignment with the spindle in the loading station by the transfer member 50 etc. the tubular member or accelerated spindle 73 moves forward until the resilient fingers 81 of the chuck collet 80 engage the work blank W, see Fig. 4. With the work supported in the chuck collet 80 the rear slide 25 together with the transfer member 50 and the lower part 33 of the magazine B returns to their starting or rear position, illustrated in dot and dash lines in Fig. 2. The tubular member 73 again moves forward carrying the work blank W to the chuck 15, after which the chuck 15 is closed and the tubular member 73 together with the chuck collet 80 retracted.

At or about the time the retracting movement of the tubular member 73 commences, the forward movement of the tool slide 17 is initiated. The forward movement of the tool slide 17 and the retracting movement of the tubular member 73 continues until the tapered surface 83 engages the tapered surfaces 89, see Fig. 5, after which the tubular member 73 moves as a unit with the tool slide 17. The forward position of the tool slide 17 is illustrated in dash lines in Fig. 4. As the tool slide 17 approaches this position and during the cutting operation of the tool the enlarged ends 82 of the resilient fingers 81 are seated in the taper 89 of the annular ring 88, see Fig. 5, which forms a support for the front end of the tool holder then projecting beyond the chuck collet 80 and the annular member 85. The interior surface 84 of the enlarged ends 82 of the resilient finger 81 engage the outside surface of the tool holder within the annular ring 88 as illustrated in the above mentioned figure.

The invention has been described with reference to an automatic multiple spindle indexible type of chucking machine in which all the operations are automatically performed in predetermined sequence controlled from a main cam shaft of the machine, including the opening and closing of the chucks, the advance and retraction of the tool slide, accelerated spindle and the cross-slide, and the indexing of the spindle turret etc. While the invention has been described with reference to a particular embodiment it is to be understood that it is capable of various modifications within its scope and that the application is intended to cover any and all variations, uses, or adaptations thereof following, in general, the principles of the invention and including such departures from the present disclosure as come within knowledge or customary practice in the art to which it pertains and as may be applied to the essential features set forth and as fall within the scope of the invention and I particularly point out and claim as my invention:

1. In a machine of the character described, a rotatable spindle and a chuck carried thereby, a magazine comprising a curved chute the upper end of which opens towards the front of the machine supported by said machine and adapted to carry a plurality of work blanks, a transfer member slidably supported on said machine and operatively connected to said magazine, means for moving said transfer member to position a work blank carried thereby in axial alignment with said chuck, a cylindrical tool slide, chuck means slidably supported by said cylindrical tool slide adapted to grip a blank supported in said transfer member, and means for reciprocating said chuck means whereby said blank is transferred from said transfer member to said chuck.

2. In a machine of the character described, a chuck, a magazine comprising a stationary section and a movable section supported by said machine and adapted to carry a plurality of work blanks, a transfer member operatively connected to the movable section of said magazine and adapted to receive a work blank therefrom, means for moving said transfer member transversely of said chuck to position a work blank carried thereby in axial alignment with said chuck, a tool slide, an accelerated spindle slidably supported by said tool slide, means carried by said accelerated spindle adapted to engage a work blank supported in said transfer member, and means for reciprocating said accelerated spindle in predetermined timed relation to the movement of said transfer member whereby a work blank is transferred from said magazine to said chuck.

3. In a machine of the character described, a rotatable spindle and a chuck carried thereby, a magazine comprising a stationary section and a movable section adapted to carry a plurality of work blanks, a transfer member operatively connected to the movable section of said magazine and adapted to receive a work blank therefrom, means for moving said transfer member transversely of the axis of said spindle to position a work blank carried thereby in axial alignment with said chuck, a tool slide supported by said machine, an accelerated spindle slidably supported by said tool slide, chuck means carried by said accelerated spindle and adapted to grip a work blank, and means for reciprocating said accelerated spindle in predetermined timed relation to the movement of said transfer member whereby a work blank is transferred from said magazine to said chuck.

4. In a machine of the character described, a chuck, a magazine adjacent said machine and adapted to carry a plurality of work blanks, a transfer member cooperating with said magazine and adapted to receive a work blank therefrom, means for moving said transfer member transversely of said chuck to position a work blank carried thereby in alignment with said chuck, a tubular spindle slidably supported by said machine, chuck means carried by said tubular spindle adapted to grip a work blank, a tool holder supported within said tubular spindle, and means for reciprocating said tubular spindle in predetermined timed relation to the movement of said transfer member whereby a work blank is transferred from said magazine to said chuck.

5. In a machine of the character described, a rotatable spindle and a chuck carried thereby, a magazine pivotally adjacent said machine and adapted to carry a plurality of work blades, a transfer member operatively connected to said magazine and adapted to receive a work blank therefrom, means for moving said transfer member transversely of the axis of said spindle to position a work blank carried thereby in axial alignment with said chuck, a tool slide supported by said machine, a tubular spindle slidably supported by said tool slide, chuck means carried by said tubular spindle adapted to grip a work blank, a tool holder supported by said tool slide within said tubular spindle, and means for reciprocating said tubular spindle in predetermined timed relation to the movement of said transfer member whereby a work blank is transferred from said magazine to said chuck.

6. In a machine of the character described, a spindle rotatably supported in said machine and a chuck carried thereby, an accelerated spindle slidably supported in said machine, a tool holder carried by said machine inside of said accelerated spindle, means for moving said accelerated spindle relative to said tool holder, and means supported by said machine cooperating with said accelerated spindle to form an overhang support for said tool holder.

7. In a machine of the character described, a spindle rotatably supported in said machine and a chuck carried thereby, a tool slide supported in said machine, an accelerated spindle slidably supported in said tool slide in axial alignment with said spindle, a tool holder carried by said tool slide inside of said accelerated spindle, means for moving said accelerated spindle relative to said tool holder, and means supported by said machine cooperating with said accelerated spindle to form an overhang support for said tool holder.

8. In a machine of the character described, a rotatable spindle and a chuck carried thereby, a magazine connected to said machine and adapted to carry a plurality of work blanks, a transfer member adapted to receive a work blank from said magazine, means for moving said transfer member transversely of the axis of said spindle to position a work blank carried thereby in axial alignment with said chuck, a tool slide supported by said machine, a tubular spindle slidably supported in said tool slide, chuck means carried by said tubular spindle adapted to grip a work blank, a tool holder carried by said tool slide within said tubular spindle, and means carried by said tool slide adapted to cooperate with said tubular member to form an overhang support for said tool holder.

9. In a machine of the character described, the combination of a frame, a chuck supported by said frame, a magazine supported by said frame adjacent said chuck and adapted to carry a plurality of work blanks, a transfer member slidably supported by said frame and operatively connected to said magazine, means for moving said transfer member relative to said magazine and transversely of said chuck whereby a work blank carried by said transfer member is positioned in axial alignment with said chuck, chuck means slidably supported by said frame in axial alignment with said chuck, and means for reciprocating said chucks means whereby a work blank carried by said transfer member is transferred from said transfer member to said chuck.

10. In a machine of the character described, the combination of a frame, a spindle turret rotatably supported by said frame, a plurality of spindles rotatably supported in said spindle turret, a chuck carried by each of said spindles, means for automatically indexing said spindle turret, means for automatically operating said chucks, a magazine pivotally supported on said frame adjacent said spindles and adapted to carry a plurality of work blanks, a transfer member slidably supported on said frame and pivotally connected to said magazine, means for moving said transfer member transversely of the axis of said spindle whereby a work blank carried thereby is positioned in axial alignment with one of said chucks, a tool slide slidably supported by said frame, an accelerated spindle slidably supported in said tool slide, chuck means carried by said accelerated spindle, and means for moving said accelerated spindle in predetermined timed relation to the movements of said transfer member whereby a work blank is positioned in said chuck.

11. In a machine of the character described, the combination of a frame, a spindle turret rotatably supported by said frame, a plurality of spindles rotatably supported in said spindle turret, a chuck carried by each of said spindles, means for automatically indexing said spindle turret, means for automatically operating said chucks, a magazine pivotally supported on said frame adjacent said spindles and adapted to carry a plurality of work blanks, a transfer member slidably supported on said frame and pivotally connected to said magazine, means for moving said transfer member transversely of the axis of said spindle whereby a work blank carried thereby is positioned in axial alignment with one of said chucks, a tool slide slidably supported by said frame, an accelerated spindle slidably supported in said tool slide, chuck means carried by said accelerated spindle, means for moving said accelerated spindle in predetermined timed relation to the movements of said transfer member whereby a work blank is positioned in said chuck, a tool holder carried by said tool slide inside said accelerated spindle, and means carried by said tool slide adapted to cooperate with said accelerated spindle to form an overhang support for said tool holder.

12. A blank magazine and chucking device of the character described, comprising a chute formed of two parts pivotally connected together adapted to support a plurality of work blanks, a transfer member pivotally connected to said chute and adapted to receive a work blank therefrom, means for reciprocating said transfer member to position a work blank carried thereby in alignment with a chuck, and means for transferring said work blank from said transfer member to said chuck.

13. A blank magazine and chucking device of the character described, comprising a chute adapted to be pivotally supported adjacent a machine and to support a plurality of work blanks, a transfer member pivotally connected to said chute and adapted to receive a work blank therefrom, means for reciprocating said transfer member and oscillating said chute whereby a work blank carried by said transfer member is positioned in alignment with a chuck, and means for transferring said work blank from said transfer member to said chuck.

14. In a machine of the character described, a chuck, a magazine supported adjacent said chuck and adapted to support a plurality of work blanks, means for transferring a work blank from said magazine to said chuck comprising a chuck member slidably supported in axial alignment with said chuck, a tool holder supported coaxial with said chuck member, and means for moving said member and said tool holder.

15. In a machine of the character described, a chuck, a magazine supported adjacent said chuck and adapted to support a plurality of work blanks, means for transferring a work blank from said magazine to said chuck comprising a chuck member slidably supported in axial alignment with said chuck, a tool holder supported coaxial with said chuck member, means for reciprocating said tool holder, and means for moving said chuck member relative to said tool holder.

16. In a machine of the character described, a chuck, a tool slide, an accelerated member slidably supported coaxial with said chuck, means carried by said accelerated spindle for engaging a work blank, a tool holder supported coaxial with said accelerated member, means for moving said tool holder relative to said chuck, and means for moving said accelerated member relative to said tool holder.

17. In a machine of the character described, a chuck, an accelerated spindle supported coaxial with said chuck, means carried by said accelerated spindle for engaging a work blank, a tool holder supported coaxial with said accelerated spindle, means for moving said tool holder, means for moving said accelerated spindle relative to said tool holder, and means supported by said machine forming an overhanging support for said tool holder.

18. In a machine of the character described, the combination of a frame, a spindle rotatably supported in said frame, a chuck carried by said spindle, a tool slide supported by said frame, an accelerated spindle slidably supported in said tool slide coaxial with said spindle, means carried by said accelerated spindle for engaging a work blank, a tool holder supported by said tool slide coaxial with said accelerated spindle, means for moving said accelerated spindle relative to said tool holder, and means supported by said frame cooperating with said accelerated spindle to form an overhanging support for said tool holder.

19. In a machine of the character described, a rotatable spindle, a chuck carried by said spindle, a magazine supported by said machine and adapted to carry a plurality of work blanks, means at the lower end of said magazine for supporting a work blank, means for moving said magazine transversely of the axis of said spindle to position the lower work blank carried thereby in axial alignment with said chuck, a tool slide supported by said machine, a member slidably supported in said tool slide, means for moving said member, chuck means carried by said member adapted to grip a work blank in said magazine and transfer the same to said chuck, a tool holder supported by said tool slide coaxial with said member, and means carried by said tool slide adapted to cooperate with said member to form an overhanging support for said tool holder.

HARRY W. RUPPLE.